April 16, 1963   F. J. BAGEMAN   3,085,442
WHEEL BALANCING METHOD
Filed Sept. 19, 1961
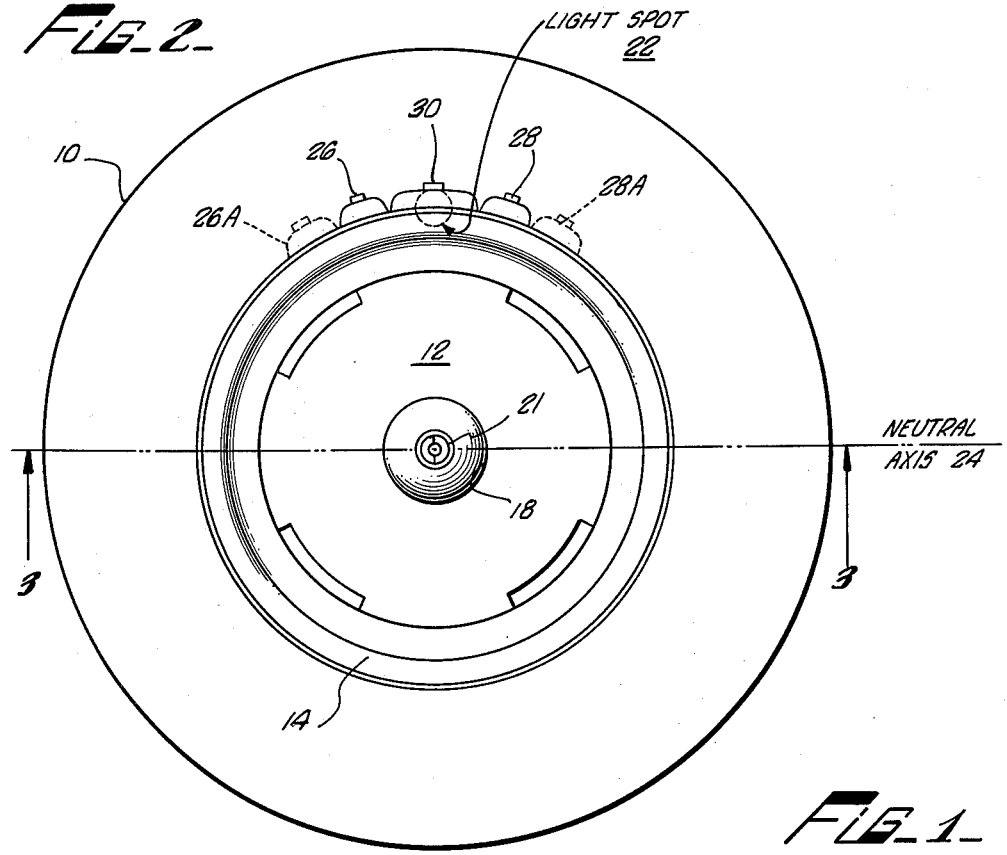
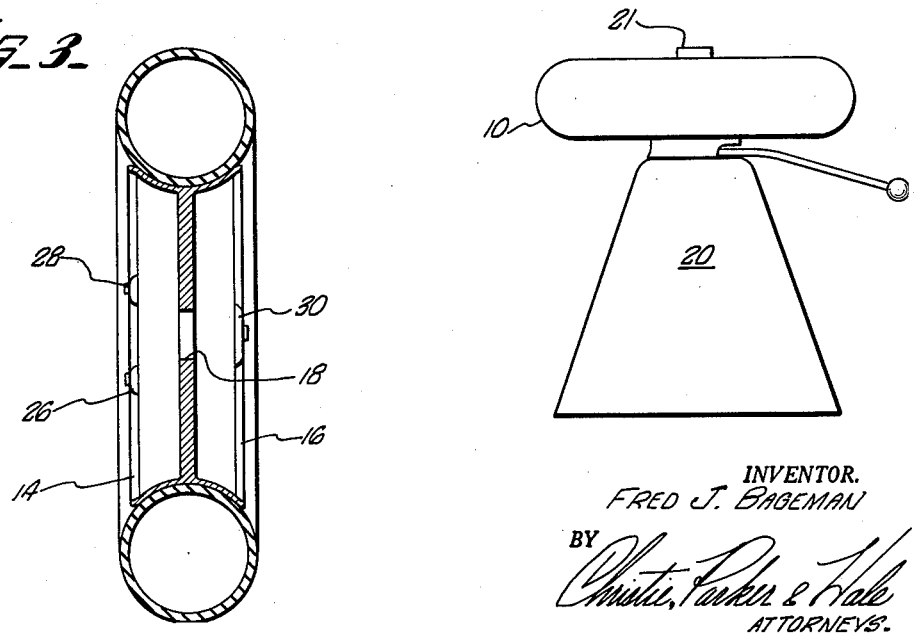
INVENTOR.
FRED J. BAGEMAN
BY
Christie, Parker & Hale
ATTORNEYS.

United States Patent Office 3,085,442
Patented Apr. 16, 1963

3,085,442
WHEEL BALANCING METHOD
Fred J. Bageman, 52 King's Court, Santurce, Puerto Rico
Filed Sept. 19, 1961, Ser. No. 139,236
2 Claims. (Cl. 73—483)

This invention relates to a method for balancing vehicle wheels, and has particular reference to a three-weight method for statically balancing wheels on a pivot point wheel balancing machine without upsetting the dynamic balance of the wheel. Reference is made to my co-pending U.S. patent application Serial Number 643,761 filed March 4, 1957, now Patent No. 3,002,388, and entitled "Wheel Balancing."

Pivot point machines are well known, and are commonly found in filling stations and automobile service establishments where wheel balancing services are offered to the public. The general concept is that when an automobile wheel is placed at rest horizontally on the pivot point machine, any static unbalance of the wheel will cause it to deviate from the horizontal, as indicated by a bubble level on the machine. Conventionally, the wheel is statically balanced by the application of one or more small lead weights, called wheel weights or rim weights, to the rim of the wheel in a manner which causes the wheel to return to the horizontal. The place on the wheel at which the weight or weights should be applied is indicated in a general way by observing the highest point on the wheel rim when it is tilted from the horizontal by its unbalanced condition, this highest point being referred to as the "light spot" or "point of maximum effectiveness." Each rim weight essentially is a piece of alloyed lead having a small steel clamp formed integrally therewith. The clamp snaps over the rim of the wheel when hit by a hammer.

The conventional procedure of manipulating rim weights to achieve static balance on a pivot point machine is characterized by trial and error and frequently results in upsetting the dynamic balance of the wheel, a balance for which this type machine gives no indication. In the conventional procedure, the number of weights, their size relationship and distribution are wide open questions when a wheel is to be balanced; and, the answer to these questions is dictated by the improvision of the operator in the light of what weight sizes he happens to have on hand in determining a single weight to balance the wheel or, if no single weight can be found, in arriving at some arbitrary combination of weights whose position on the rim may be adjusted to balance the wheel. For this purpose, an inventory of up to twenty standard weight sizes is customarily maintained.

In my co-pending application, referred to above, these problems are eliminated by a procedure for the employment of four equal weights to balance each wheel, the result being a systematic and uniform method for balancing all wheels and a drastic reduction in the inventoried weight sizes necessary or desirable. Since the end product of the procedure is an equal division of the four weights between opposite sides of the wheel, static balance is obtained while preserving, and almost always improving, the dynamic balance of the wheel.

The method of the present invention, while differing procedurally from that of my co-pending application, may be employed to achieve to a large extent similar advantages over the conventional procedure, yet requires the employment of only three weights per wheel. In this method, the wheel is positioned horizontally on a wheel balancing machine and any deviation of the plane of the wheel from the horizontal is measured to ascertain the circumferential position of the light spot on the wheel. A set of weights having a total weight sufficient to balance the wheel is placed on the wheel adjacent the light spot. The set of weights includes two weights of equal weight value and one weight of double weight value. While leaving the double value weight at the light spot, the two equal value weights are adjusted symmetrically and oppositely about the light spot on the wheel rim until the wheel assumes a balanced horizontal position. The two equal value weights are connected to the wheel rim on one side of the wheel and the double value weight is connected to the rim on the opposite side of the wheel, at the determined circumferential positions for the weights.

Referring now to the drawing, FIG. 1 is a schematic elevation of an automobile wheel resting on a conventional pivot point wheel balancing machine;

FIG. 2 is a schematic top view of the wheel on the machine; and

FIG. 3 is a diagrammatic sectional elevation of the wheel taken along line 3—3 of FIG. 2 and showing the placement of rim weights on opposite sides of the wheel.

FIGS. 1 to 3 illustrate an automobile wheel having a tire 10 mounted on a wheel 12. The wheel has an outboard rim portion 14, an inboard rim portion 16, and a central aperture 18. The wheel rests on a conventional wheel balancing machine 20.

An upper portion of the wheel balancing machine, which includes a balance indicator 21 usually in the form of a circular bubble level, extends through the aperture 18 of the wheel.

When the wheel is placed on the machine so that the plane of the wheel is in a horizontal position, any static unbalance of the wheel will cause the plane of the wheel to deviate from the horizontal. By observing the bubble level and the tilting of the wheel, the highest point of the wheel can be ascertained. This point is usually referred to as the "light spot" and is the theoretical position on the rim of the wheel where the application of a single weight of suitable size will bring the wheel into perfect static balance. The light spot is indicated in FIG. 1 of the drawing by a dotted circle 22. The wheel theoretically, is divided into a light side and a heavy side by a neutral axis 24.

In the process of the invention a set of three rim weights having a total weight value sufficient to balance the wheel is placed on the wheel adjacent the light spot, as is illustrated in FIG. 1. The set of three weights includes two equal value weights 26, 28, and one double value weight 30. The double value weight is left at the light spot, and the two equal value weights are adjusted symmetrically and oppositely about the light spot on the rim of the wheel until the wheel assumes a balanced horizontal position as indicated by the balance indicator or bubble level 21. This determines the circumferential positions for the three weights at which the wheel is balanced statically, and such positions may be marked by a piece of chalk.

The weights are connected to the wheel rim at their circumferential positions. However, as best seen in FIG. 2, the two equal value weights are connected to the rim at one side of the wheel and the double value weight is connected to the wheel at the opposite side of the wheel. Hence, while all the weights are initially placed on one side of the wheel, to complete the procedure, either the double value weight or the two equal value weights must be transposed to corresponding circumferential positions on the opposite side of the wheel.

To ascertain a set of weights sufficient to balance the wheel, a number of sets of weights of different total weight value are available. The lightest set is first placed adjacent light spot and if it is insufficient to tip the wheel back to the horizontal, the next heavier set is then placed at the light spot, etc., until the lightest set which is just sufficient to overbalance the wheel is found. With this set on the wheel, only a slight spreading of the two equal value weights in the set is required to bring the wheel into perfect static balance, and there is no upsetting effect on dynamic balance. Typical adjusted positions for the two equal value weights are indicated in dotted lines as 26A and 28A.

It should be appreciated that while the adjustability of the two equal value weights 26, 28 together with the procedural step of transposing the two equal value weights and the double value weight to opposite sides of the wheel, together allow for the utilization of an inexact amount of total mass weight to achieve perfect static balance while preserving or in many cases improving upon dynamic balance, nevertheless, one should guard against the possibility of using a gross excess of mass weight in the chosen set of weights whereby it is required to adjust the two equal value weights a great distance around the rim of the wheel in order to achieve static balance, for under the latter circumstance, particularly if the two equal value weights are adjusted beyond the neutral axis, there results dynamic unbalance when the weights are connected to opposite sides of the wheel, and under these conditions it might be more advantageous to connect the weights all to the same side of the wheel. Stated differently, the set of three weights placed adjacent the light spot need not be exactly the weight needed to balance the wheel in that position; however, such set should be a reasonable approximation thereof.

I claim:

1. A method for balancing an automobile wheel comprising the steps of positioning the wheel horizontally on a wheel balancing machine, measuring any deviation of the plane of the wheel from the horizontal to ascertain the circumferential position of the light spot on the wheel, placing on the wheel adjacent the light spot a set of two equal value and one double value rim weights having a combined mass weight sufficient to overbalance the wheel, adjusting the two equal value rim weights symmetrically and oppositely about the light spot on the wheel until the wheel assumes a balanced horizontal position while leaving the double value weight adjacent the light spot, and connecting the two equal value weights to the wheel and the double value weight to the rim on the opposite side of the wheel at the determined circumferential positions for the weights.

2. A method for balancing an automobile wheel comprising the steps of positioning the wheel horizontally on a wheel balancing machine, measuring any deviation of the plane of the wheel from the horizontal to ascertain the circumferential position of the light spot on the wheel, placing on the wheel adjacent the light spot a set of two equal value and one double value rim weights having a combined mass weight sufficient to balance or slightly overbalance the wheel, if the wheel is overbalanced adjusting the two equal value rim weights symmetrically and oppositely about the light spot on the wheel until the wheel assumes a balanced horizontal position while leaving the double value weight adjacent the light spot, and connecting the two equal value weights to the wheel and the double value weight to the rim on the opposite side of the wheel at the determined circumferential positions for the weights.

No references cited.